(12) United States Patent
Chang et al.

(10) Patent No.: US 11,861,261 B2
(45) Date of Patent: Jan. 2, 2024

(54) ELECTRONIC DEVICE

(71) Applicant: ASUSTeK COMPUTER INC., Taipei (TW)

(72) Inventors: Po-Hsin Chang, Taipei (TW); Kai-Peng Chung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 138 days.

(21) Appl. No.: 17/568,010

(22) Filed: Jan. 4, 2022

(65) Prior Publication Data

US 2022/0222032 A1    Jul. 14, 2022

(30) Foreign Application Priority Data

Jan. 12, 2021 (TW) .................................. 110101178

(51) Int. Cl.
*G06F 3/16* (2006.01)
*G08B 5/36* (2006.01)

(52) U.S. Cl.
CPC .............. *G06F 3/162* (2013.01); *G06F 3/165* (2013.01); *G08B 5/36* (2013.01)

(58) Field of Classification Search
CPC ............ G06F 3/162; G06F 3/165; G08B 5/36
See application file for complete search history.

(56) References Cited

U.S. PATENT DOCUMENTS

| 5,991,805 | A  | * | 11/1999 | Krukovsky | ............ | G09G 5/006 |
| | | | | | | 709/223 |
| 9,774,942 | B1 | * | 9/2017 | Rauschmayer | ...... | H04R 1/1041 |
| 10,439,390 | B1 | * | 10/2019 | Hung | ........................ | H02J 1/14 |
| 11,128,955 | B1 | * | 9/2021 | Li | ............................ | H04R 3/04 |
| 2006/0153405 | A1 | * | 7/2006 | Myers | .................. | H03G 3/3005 |
| | | | | | | 381/104 |
| 2012/0076326 | A1 | * | 3/2012 | He | .......................... | H04R 3/00 |
| | | | | | | 381/120 |
| 2015/0008831 | A1 | * | 1/2015 | Carrigan | ................ | H05B 45/22 |
| | | | | | | 315/153 |

(Continued)

FOREIGN PATENT DOCUMENTS

| CN | 1866770 A | | 11/2006 |
| CN | 102572632 A | * | 7/2012 |

(Continued)

*Primary Examiner* — Chico A Foxx
(74) *Attorney, Agent, or Firm* — McClure, Qualey & Rodack, LLP

(57) ABSTRACT

The electronic device includes an audio module, an external audio processing module, a local audio processing module, a switching module, and a setting module. The external audio processing module processes an external audio signal transmitted via a communication channel. The local audio processing module processes a local audio signal. The switching module is connected between the audio module, and the external audio processing module and the local audio processing module. In the first state, the audio module and the external audio processing module are connected. In the second state, the audio module, and the local audio processing module are connected. The setting module is connected to the switching module. The setting module sets the switching module to switch the electronic device to the first state or the second state in response to an input signal.

8 Claims, 4 Drawing Sheets

(56) References Cited

U.S. PATENT DOCUMENTS

| | | | | |
|---|---|---|---|---|
| 2015/0200638 A1* | 7/2015 | Ko | ................... | H03G 3/3005 |
| | | | | 381/104 |
| 2017/0193962 A1* | 7/2017 | Yoon | ................... | G06F 3/147 |
| 2020/0293460 A1* | 9/2020 | Son | ................... | G06F 13/20 |

FOREIGN PATENT DOCUMENTS

| | | | | | |
|---|---|---|---|---|---|
| CN | 106125857 A | * | 11/2016 | | |
| CN | 106125857 A | | 11/2016 | | |
| CN | 110062265 A | | 7/2019 | | |
| JP | 2007124469 A | * | 5/2007 | ......... | H04N 21/4122 |
| WO | WO-2016183763 A1 | * | 11/2016 | ............ | G06F 3/14 |

* cited by examiner

ELECTRONIC DEVICE

CROSS-REFERENCE TO RELATED APPLICATION

This application claims the priority benefit of Taiwan application serial No. 110101178, filed on Jan. 12, 2021. The entirety of the above-mentioned patent application is hereby incorporated by reference herein and made a part of specification.

BACKGROUND OF THE INVENTION

Field of the Invention

The invention relates to an audio technology and, more particularly, to an electronic device switching between different audio processing channels.

Description of the Related Art

Electronic device with speakers currently processes audio signals that pre-stored at the local end but not from external devices. As a result, users need to install additional software or have other settings to receive and play audio data from other external devices. However, when the electronic device is in a standby mode or a power-off mode, external audio data cannot be processed.

BRIEF SUMMARY OF THE INVENTION

An electronic device including a first state and a second state is provided. The electronic device comprises an audio module; an external audio processing module, configured to process an external audio signal, when the external audio processing module is connected to the audio module, the electronic device is in the first state; a local audio processing module, configured to process a local audio signal, when the local audio processing module is connected to the audio module, the electronic device is in the second state; a switching module selectively switching electronic connection between the audio module, the external audio processing module, and the local audio processing module; and a setting module connected to the switching module, the setting module sets the switching module to switch the electronic device to the first state or the second state in response to an input signal.

To sum up, the electronic device of the disclosure is capable to switch the audio source between local audio signal and the external audio signal. The function of processing external audio signal is not affected by the standby mode or the power-off mode of the electronic device.

DETAILED DESCRIPTION OF THE EMBODIMENTS

Terms "first", "second" and so on are used to distinguish components, but not used to limit the order or the differences of the components. In addition, the terms "coupled" or "connected" refers to two or more components directly or indirectly physically or electrically contact with each other. For example, when the first device is coupled to the second device, it means that the first device is directly and electrically connected to the second device, or indirectly and electrically connected to the second device through other devices or connection means.

Figure 1:
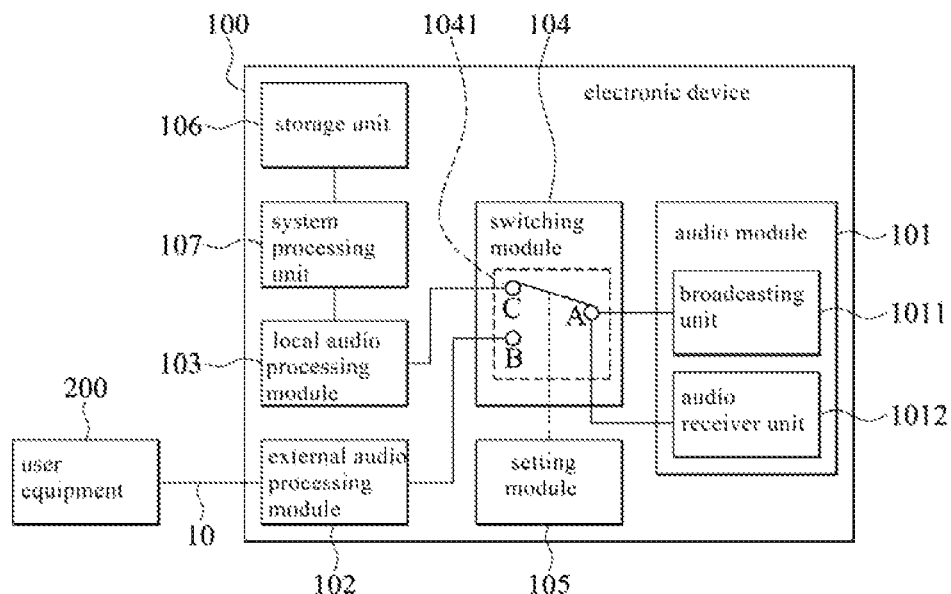
FIG. 1 is a block diagram showing an electronic device according to an embodiment.

FIG. 1 is a block diagram showing an electronic device 100 according to an embodiment. The electronic device 100 includes an audio module 101, an external audio processing module 102, a local audio processing module 103, a switching module 104, a setting module 105, a storage unit 106, and a system processing unit 107. The switching module 104 is connected to the audio module 101, the external audio processing module 102 and the local audio processing module 103. The setting module 105 is connected to the switching module 104. The system processing unit 107 is connected to the local audio processing module 103 and the storage unit 106.

The local audio processing module 103 processes the local audio signal with audio processing programs, such as encoding, decoding, compression, decompression, analog-to-digital conversion, or digital-to-analog conversion. That is, the local audio processing module 103 converts aforesaid audio data to audio signals adapted to be played by the audio module 101. The local audio processing module 103 also converts the audio signals from the audio module 101 to audio data. The local audio signal is stored in the storage unit 106 of the electronic device 100. In embodiments, the storage unit 106 is a temporary or non-temporary storage medium such as a memory or a hard disk.

In an embodiment, the storage unit 106 and the system processing unit 107 are formed integrated, that is, the storage unit 106 is an inner storage of the system processing unit 107. The local audio processing module 103 includes an audio codec.

The external audio processing module 102 processes the external audio signal with audio processing programs such as encoding, decoding, compression, decompression, analog-to-digital conversion, and digital-to-analog conversion. The external audio signal is stored in another device (the user equipment 200 hereinafter) other than the electronic device 100. The user equipment 200 communicates with the electronic device 100 via the communication channel 10. The electronic device 100 and the user equipment 200 have communication interfaces corresponding to the communication protocol of the communication channel 10, respectively.

The communication interface supports wired communication technology or wireless communication technology. The wired communication technology is Universal Serial Bus (USB), Thunderbolt, High Definition Multimedia Interface (HDMI), or Ethernet in embodiments, which is not limited herein. The wireless communication technology is Wifi, Bluetooth, radio frequency in embodiments, which is not limited herein.

The external audio processing module 102 includes an audio codec for converting audio data from the communication channel 10 to audio signals that adapted to be played by the audio module 101, or converting audio signals from the audio module 101 to the audio data. Then, the audio data is sent through the communication channel 10.

The switching module 104 is used to switch audio transmission paths of the audio module 101. In a first state, the switching module 104 is connected between the audio module 101 and the external audio processing module 102. In the second state, the switching module 104 is connected to between the audio module 101 and the local audio processing module 103. In the first state, the external audio signal is transmitted between the audio module 101 and the external audio processing module 102. In the second state, the local audio signal is transmitted between the audio module 101 and the local audio processing module 103.

In an embodiment, the switching module 104 includes a switch 1041. The switch 1041 includes a plurality of terminals A, B, and C. The terminal A is connected to the audio module 101, the terminal B is connected to the external audio processing module 102, and the terminal C is connected to the local audio processing module 103. In the first state, the switch 1041 is conducted between the terminal A and the terminal B, and then the audio module 101 is connected to the external audio processing module 102.

At the time, the terminal A and the terminal C are disconnected (not conducted), and thus the audio module 101 is disconnected to the local audio processing module 103. In the second state, the switch 1041 is conducted between the terminal A and the terminal C, and then the audio module 101 and the local audio processing module 103 are connected. At the time, the terminal A and the terminal B are disconnected (not conducted), and then the audio module 101 and the external audio processing module 102 are disconnected. In an embodiment, the switch 1041 is an electronic switch (such as a transistor).

The setting module 105 sets the switching module 104 in response to an input signal to switch the electronic device 100 to the first state or the second state. In an embodiment, the setting module 105 is a button (such as a mechanical button or a capacitive button) to detect the input signal generated via an input operation.

In an embodiment, the setting module 105 also receives the input signal from another device (such as a remote control). The setting module 105 transmits an enable signal to the switching module 104 in response to the input signal. The switching module 104 switches the conduction state in response to the enable signal. For example, the switching module 104 switches the electronic device 100 from the first state to the second state, or switches the electronic device 100 from the second state to the first state.

In an embodiment, the audio module 101 includes a broadcasting unit 1011. The broadcasting unit 1011 is connected to the switching module 104 (the terminal A of the switch 1041). In the first state, the broadcasting unit 1011 plays the external audio signal. In the second state, the broadcasting unit 1011 plays the local audio signal. In embodiments, the broadcasting unit 1011 is a speaker or an analog audio source interface, which is not limited herein.

In an embodiment, the audio module 101 further includes an audio receiver unit 1012. The audio receiver unit 1012 is connected to the switching module 104 (the terminal A of the switch 1041). The audio receiver unit 1012 is used to record sound to generate audio signals.

In the first state, the audio receiver unit 1012 records the sound as the external audio signal, and the external audio signal is transmitted to the external audio processing module 102. In the second state, the audio receiver unit 1012 records the sound as the local audio signal, and the external audio signal is transmitted to the local audio processing module 103. The audio receiver unit 1012 is a speaker or an analog audio source interface, which is not limited herein.

From the above description, the audio transmitting paths are able to be switched by users via the setting module 105, and then the audio module 101 plays/records the local audio signal or the external audio signal.

In an embodiment, the broadcasting or recording function of the electronic device 100 is better than that of the user equipment 200. For example, the user equipment 200 does not have the broadcasting or the recording function; or the user equipment 200 has a broadcasting and recording device, but the sound playing quality or recording quality is not as good as that of the electronic device 100. In this situation, the broadcasting and recording function are provided by the electronic device 100 instead of the user equipment 200.

In embodiments, the electronic device 100 is a notebook computer, a tablet computer, a desktop computer, and a mobile phone, which is not limited herein. The user equipment 200 is a personal digital device, a mobile phone, and a smart watch, which is not limited herein.

Figure 2:
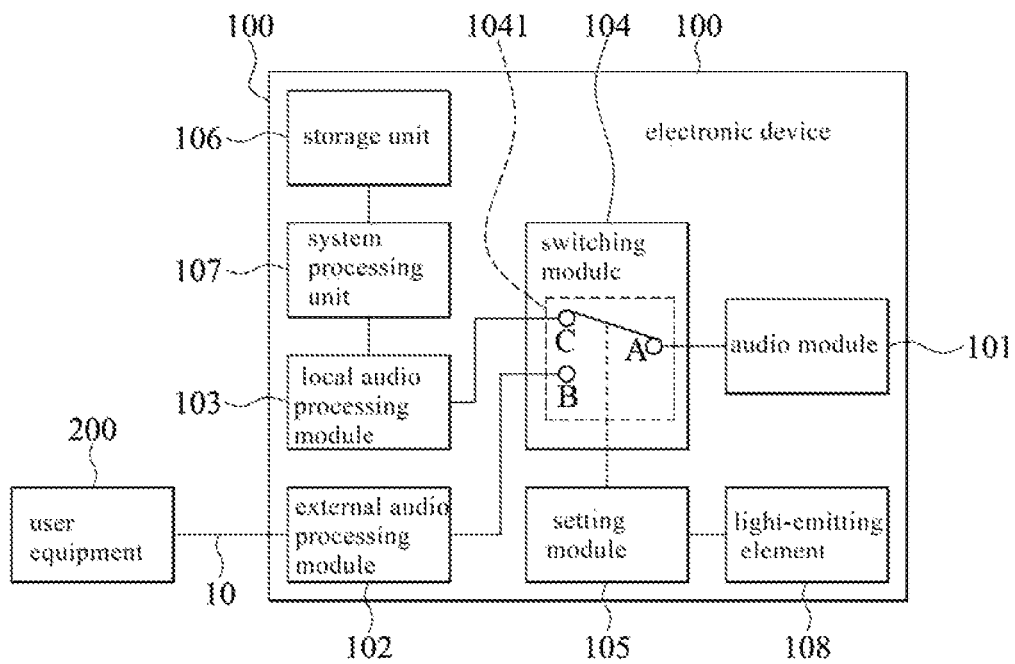
FIG. 2 is a block diagram showing an electronic device according to an embodiment.

FIG. 2 is a block diagram of an electronic device according an embodiment of the disclosure. In an embodiment, the electronic device 100 further includes a light-emitting element 108. The light emitting element 108 is connected to the setting module 105.

In an embodiment, the light-emitting element 108 is a light-emitting diode module. When the setting module 105 receives the input signal, the light-emitting element 108 selectively displays a first notification signal or a second notification signal according to the input signal. For example, when the setting module 105 sets the electronic device 100 to the first state, the light-emitting element 108 displays the first notification signal. When the setting module 105 sets the electronic device 100 to the second state, the light-emitting element 108 displays the second notification signal.

In this way, users distinguish whether the electronic device 100 is switched to process the local audio signal or the external audio signal according to the first indication signal or the second indication signal. In embodiments, the first notification signal and the second notification signal are distinguished by luminous intensity, luminous color, or luminous frequency (such as brightness, blinking speed).

Figure 3:
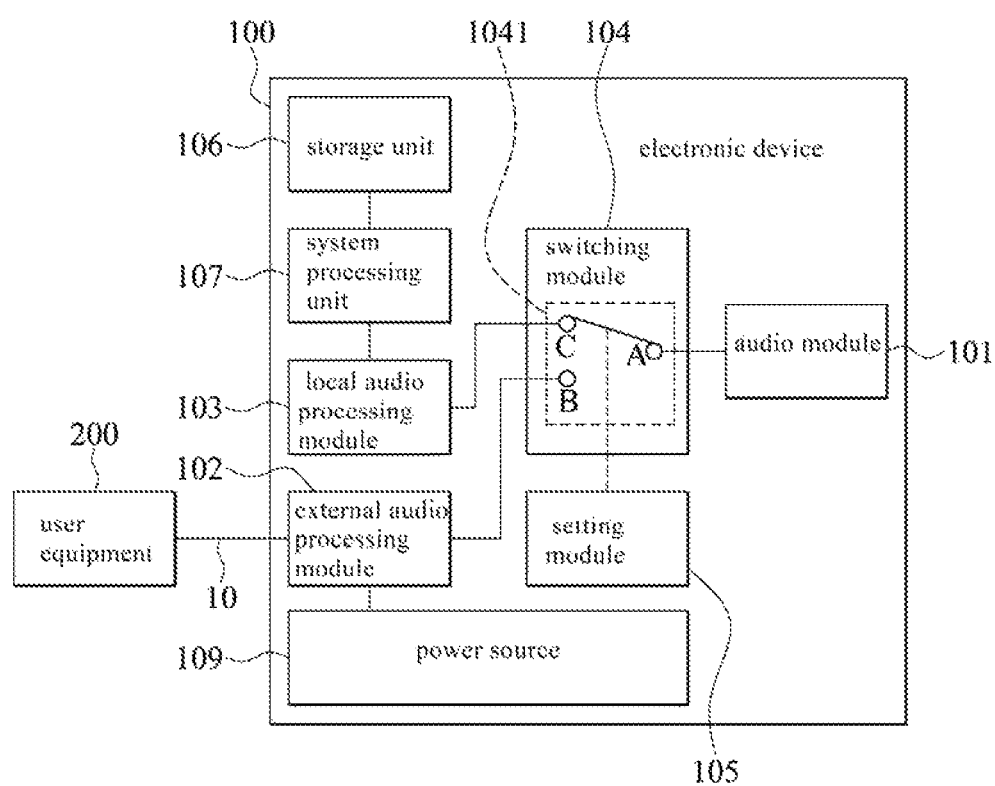
FIG. 3 is a block diagram showing an electronic device according to an embodiment.

FIG. 3 is a block diagram of an electronic device according to an embodiment of the disclosure. In an embodiment, the electronic device 100 further includes a power source 109. The power source 109 is connected to the external audio processing module 102. In the first state, the power source 109 supplies power to the external audio processing module 102. In an embodiment, the setting module 105 sets the electronic device 100 to the first state when the electronic device 100 is in a standby mode.

For example, a switch (not shown) is configured between the power source 109 and the external audio processing module 102. In the first state, the setting module 105 sets the switching module 104 to conduct the switch (or the setting module 105 conducts the switch directly) and supplies power to the external audio processing module 102. Then, the electronic device 100 processes the external audio signal. Therefore, when the electronic device 100 is set to the first state in a standby mode (such as a sleep state) or a power-off mode, the electronic device 100 can still process the external audio signal.

In the second state, the setting module 105 sets the switching module 104 to turn off the switch (or the setting module 105 directly turns off the switch) and stops supplying power to the external audio processing module 102. In embodiments, the power source 109 is a battery or an external power device (such as an external adapter charging device).

It embodiments, the audio module 101, the external audio processing module 102, the local audio processing module 103, the switching module 104, the setting module 105, the storage unit 106, the system processing unit 107, and the light emitting element 108 are connected to power source 109 to perform functions, respectively.

Figure 4:
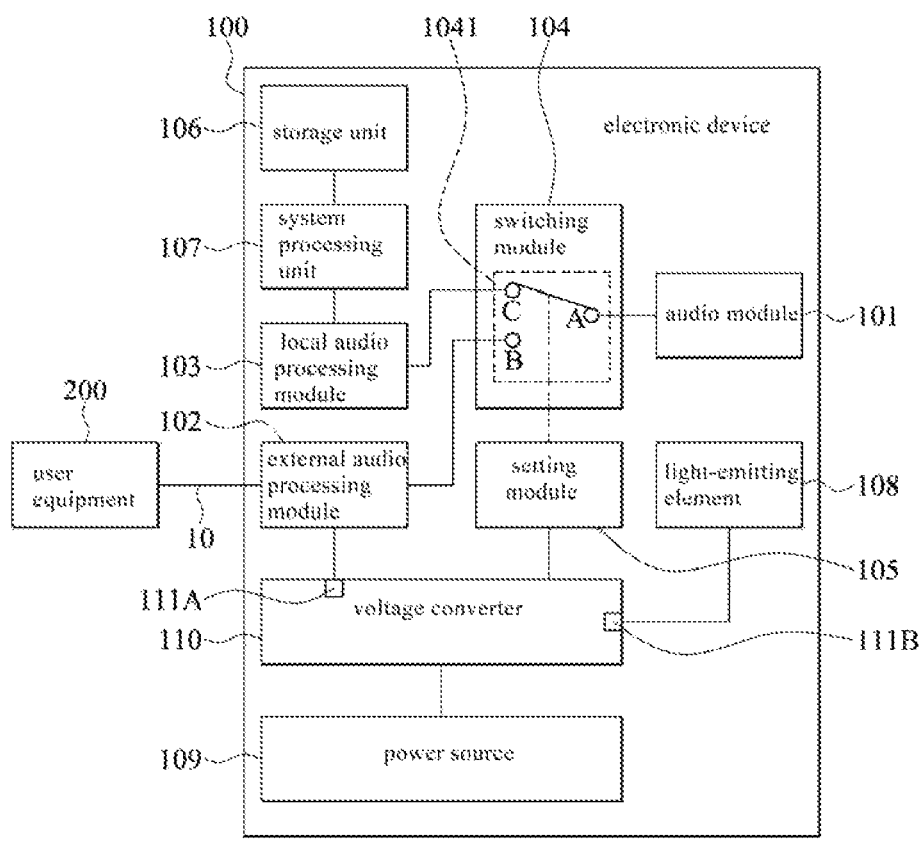
FIG. 4 is a block diagram showing an electronic device according to an embodiment.

FIG. 4 is a block diagram of an electronic device according to an embodiment of the disclosure. In an embodiment, the electronic device 100 further includes a voltage converter 110. The voltage converter 110 is connected to between the power source 109 and the external audio processing module 102. In an embodiment, the voltage converter 110 is a DC-to-DC converter. The voltage converter 110 adjusts the voltage value of the power source 109 to an input voltage adapted for the external audio processing module 102.

In the first state, the power source 109 supplies power to the voltage converter 110. The voltage converter 110 performs voltage modulation (for example, regulating, stepping down, or stepping up) on the power received from the power source 109 to adjust the voltage value of the power to be equal to, slightly greater or slightly less than the input voltage specified by the external audio processing module 102. Then, the power with the adjusted voltage value is outputted to the external audio processing module 102 as the input voltage.

In an embodiment, the voltage converter 110 is also connected to the setting module 105. When the setting module 105 sets the electronic device 100 to the second state, the voltage converter 110 is disabled (for example, the setting module 105 transmits a disable signal to the voltage converter 110) to stop the power source 109 supplying power to the external audio processing module 102. Therefore, the voltage converter 110 stops modulating the voltage value of the power source 109, and the adjusted power is not outputted to the external audio processing module 102. As result, the external audio processing module 102 does not operate because of having no power from the power source 109.

Similarly, when the setting module 105 sets the electronic device 100 to the first state, the voltage converter 110 is enabled (for example, the setting module 105 transmits an enable signal to the voltage converter 110), the power source 109 supplies power to the external audio processing module 102. Therefore, the voltage converter 110 is activated to modulate the voltage value of the power source 109. In this way, the external audio processing module 102 receives the power for operation.

In an embodiment, the voltage converter 110 further includes a plurality of output terminals (in the embodiment, the first output terminal 111A and the second output terminal 111B are taken as an example). The external audio processing module 102 is connected to the first output terminal 111A, and the light-emitting element 108 is connected to the second output terminal 111B.

In the first state, the voltage converter 110 outputs the adjusted power to the external audio processing module 102 via the first output terminal 111A. The voltage converter 110 outputs the adjusted power to the light emitting element 108 via the second output terminal 111B, and then the light-emitting element 108 emits light (for example, the light-emitting element 108 displays the first notification signal).

In an embodiment, when the driving voltage regulated by the light-emitting element 108 is the same as the input voltage regulated by the external audio processing module 102, the first output terminal 111A and the second output terminal 111B are integrated into one output terminal.

In an embodiment, the light-emitting element 108 is connected to the external audio processing module 102 (not shown), and the light-emitting element 108 is powered by the external audio processing module 102. In other words, the light-emitting element 108 and the startup and shutdown of the external audio processing module 102 are synchronous.

Figure 5:
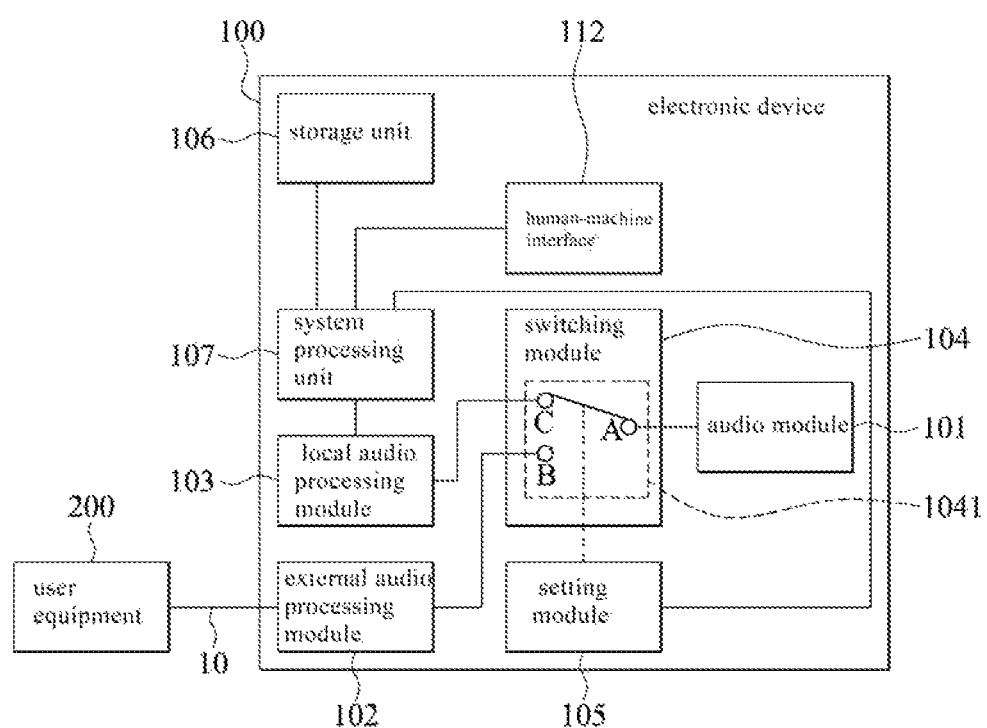
FIG. 5 is a block diagram showing an electronic device according to an embodiment.

FIG. 5 is a block diagram of an electronic device according to an embodiment of the disclosure. In an embodiment, the system processing unit 107 is also connected to the setting module 105. The setting module 105 outputs a notification signal to the system processing unit 107 in response to the switching between the first state and the second state.

In an embodiment, the setting module 105 controls the conduction state of the switching module 104, and the setting module 105 also outputs a notification signal to the system processing unit 107 according to the controlled conduction state. In an embodiment, the setting module 105 transmits an enable signal to the switching module 104 in responds to the input signal, and the switching module 104 responds to the change of the conduction state and transmits a signal (called as a feedback signal hereinafter) back to the setting module 105.

The setting module 105 outputs a notification signal to the system processing unit 107 when the setting module 105 detects the feedback signal. Then, the system processing unit 107 determines whether the electronic device 100 is switched to process the local audio signal or the external audio signal by the notification signal.

In embodiments, the electronic device 100 further includes a human-machine interface 112. The human-machine interface 112 is connected to the system processing unit 107. In embodiments, the human-machine interface 112 is a display screen, a touch screen, or a vibrator which can output vision, touch, or other user-perceivable output signals.

The system processing unit 107 outputs a switching signal via the human-machine interface 112 in response to the notification signal to remind the users that the electronic device 100 already switches the audio transmission path at the time. In an embodiment, the switching signal is a text or a graphical prompt message displayed at the screen. In an embodiment, the switching signal is a vibration signal generated by a vibrator.

To sum up, the electronic device of the disclosure provides users to switch the local audio signal or the external audio signal alternatively. The function of processing the external audio signal is not affected by the mode of the electronic device.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic device, including a first state and a second state, the electronic device, comprising:
    an audio module;

an external audio processing module, configured to process an external audio signal, when the external audio processing module is connected to the audio module, the electronic device is in the first state;

a local audio processing module, configured to process a local audio signal, when the local audio processing module is connected to the audio module, the electronic device is in the second state;

a switching module, selectively switching electronic connection between the audio module, the external audio processing module, and the local audio processing module;

a setting module, connected to the switching module, the setting module sets the switching module to switch the electronic device to the first state or the second state in response to an input signal;

a power source, connected to the external audio processing module and configured to supply power to the external audio processing module in the first state; and a voltage converter, connected between the power source and the external audio processing module and configured to adjust a voltage value of the power source to an input voltage adapted to the external audio processing module;

wherein the voltage converter is further connected to the setting module, when the setting module sets the electronic device to the second state, the voltage converter is disabled to stop the power source supplying power to the external audio processing module.

2. The electronic device according to claim 1, wherein the electronic device is in a standby mode or a power-off mode, the setting module sets the electronic device to the first state.

3. The electronic device according to claim 1, further comprising a light-emitting element connected to the setting module and selectively displaying a first notification signal or a second notification signal in response to the input signal.

4. The electronic device according to claim 1, further comprising a light-emitting element connected to an output terminal of the voltage converter, and the light-emitting element does not emit light when the voltage converter is disabled.

5. The electronic device according to claim 1, further comprising a system processing unit connected to the setting module, the setting module outputs a notification signal to the system processing unit in response to a switching between the first state and the second state.

6. The electronic device according to claim 5, further comprising a human-machine interface connected to the system processing unit, the system processing unit outputs a switching signal via the human-machine interface in response to the notification signal.

7. The electronic device according to claim 1, wherein the audio module includes a broadcasting unit which plays the external audio signal in the first state and plays the local audio signal in the second state.

8. The electronic device according to claim 1, wherein the setting module is a button.

\* \* \* \* \*